(12) United States Patent
Perez

(10) Patent No.: US 12,105,004 B2
(45) Date of Patent: Oct. 1, 2024

(54) AIRFLOW FILTER SENSOR

(71) Applicant: Steve Perez, Mesa, AZ (US)

(72) Inventor: Steve Perez, Mesa, AZ (US)

(*) Notice: Subject to any disclaimer, the term of this patent is extended or adjusted under 35 U.S.C. 154(b) by 367 days.

(21) Appl. No.: 17/835,913

(22) Filed: Jun. 8, 2022

(65) Prior Publication Data
US 2022/0404257 A1    Dec. 22, 2022

Related U.S. Application Data

(60) Provisional application No. 63/211,655, filed on Jun. 17, 2021.

(51) Int. Cl.
G01F 1/05    (2006.01)
G01F 9/00    (2006.01)
G01N 15/08    (2006.01)

(52) U.S. Cl.
CPC ......... *G01N 15/0826* (2013.01); *G01F 9/006* (2013.01); *G01N 2015/084* (2013.01)

(58) Field of Classification Search
CPC . G01F 9/006; G01F 1/05; G01F 1/053; G01F 1/06; G01F 1/075
See application file for complete search history.

(56) References Cited

U.S. PATENT DOCUMENTS

| | | | | |
|---|---|---|---|---|
| 4,391,247 A | * | 7/1983 | Shioyama | F16K 27/0218 261/65 |
| 5,092,420 A | * | 3/1992 | Sugawara | B60K 28/16 180/197 |
| 11,136,924 B1 | * | 10/2021 | Koo | F02D 9/104 |
| 2007/0294022 A1 | * | 12/2007 | Sameshima | F02D 9/02 701/102 |
| 2008/0091330 A1 | * | 4/2008 | Simpson | F02D 41/0002 701/102 |
| 2015/0298539 A1 | * | 10/2015 | Solazzo | B60K 11/085 454/143 |

* cited by examiner

*Primary Examiner* — Eric S. McCall
(74) *Attorney, Agent, or Firm* — Hartman Titus PLC; Joseph W Mott

(57) ABSTRACT

An air flow sensor for use with an air filter comprises a tubular housing with a flap that is opened by air pressure, the extent of opening increasing as the surrounding air filter becomes clogged. A terminal on the flap contacts different measurement terminals on the housing, closing individual circuits connected to an indicator, whereby a display shows when the filter is clear and when it is clogged.

18 Claims, 4 Drawing Sheets

AIRFLOW FILTER SENSOR

CROSS REFERENCE TO RELATED APPLICATIONS

This application claims the benefit of U.S. provisional patent application 63/211,655, filed Jun. 17, 2021.

TECHNICAL FIELD OF THE INVENTION

This invention presents a detection device to monitor the relative effectiveness and useful life of air filters which are generally required to be present in commercial or residential heating ventilation and air conditioning systems ("HVAC") by determining the reduction in airflow through the system due to dirty, clogged or contaminated filters.

BACKGROUND OF THE INVENTION

The proper function and maintenance of a commercial or residential HVAC generally requires the use of filters to prevent the system from being contaminated by dirt, dust and other airborne particles which can form a coating on the working surfaces of the HVAC system. The purpose of the filters is to screen the contaminants from the air flow prior to any opportunity to attach to and negatively impact the electronic and mechanical operational components of the system. Filters are placed within the direct input airflow of the ducting thus isolating the area necessary for filtration.

The filters are most effective when clean and placed within the ducts and close to the operating units. As the filter media captures particles and becomes clogged, the air flow is correspondingly reduced, requiring increased energy to maintain designed operating parameters. At the point of functional obstruction, the operating system is placed at risk from overheating and component damage. If the filter(s) become significantly contaminated then reduced air flow at the intake reduces the flow throughout the system, interfering with delivery of the designed flow of cooling or heating to the house or building. Moreover, low air flow can cause an air conditioner coil to get too cold and even freeze up, potentially damaging the compressor.

The risk of a poorly functioning filtration system is significant and all manufacturers of HVAC systems require the proper maintenance including the timely cleaning or replacement of filters in order to support any product warranty. It is commonly known that the failure to clean or replace the filters as necessary is detrimental to the system. The most typical manufacturer schedule is calendar based, requiring the replacement monthly, quarterly or the like. Manufacturers have specific programs requiring timely cleaning or replacement and the failure to do so is grounds to void the warranty of the unit.

Unfortunately, the level of pollutants is not linear and is based upon local environmental circumstances and not a general formulation as to proper maintenance, cleaning or repair. So guidelines such as monthly replacement may result in premature discard of good filters or degraded performance from clogged ones. The present invention is not time dependent but, rather, provides a systemic method of determining the current effectiveness of the filters. The present embodiment provides the ability to monitor and report the extent of the contamination and accumulation of dirt, dust and other airborne contaminants.

Due to the standard practice for the placement of HVAC filters, they are not typically located conveniently for a swift and easy examination to determine their contamination level. Most HVAC systems require a visual examination of the filters, often after removing a cover, to determine if the surface is polluted or the unit is clogged.

HVAC system sensors have been developed in prior art that utilize optical devices, airspeed sensors, flow volume sensors, differential pressure sensors, bypasses with piezo-electric sensors and/or potentiometers to measure airflow. The present invention requires no sophisticated functionality and can be produced economically to conform to the relatively low cost of the typical HVAC filter.

SUMMARY OF THE INVENTION

The present invention provides for a sensor to determine and indicate the current condition of and relative effectiveness of an HVAC filtration system. The sensor comprises a tube inserted through a small portion of the filter, with a pivotably mounted cover or flap blocking air flow through the tube. When the filter is clean, the air flow generated by the HVAC exhaust fan passes readily through the filter and the flap remains closed. As the filter collects dust and particles, air flow is restricted and some air begins to be drawn through the tube, raising the flap in the direction of the air flow. The more the surrounding filter is clogged, the more air moves through the tube and the further the flap opens.

The sensor includes an electrical circuit connecting a terminal at the bottom of the flap with a plurality of measurement terminals and one or more indicators such as LED lights. When the flap is closed, there being no air flow through the tube, the flap terminal contacts a first measurement terminal, closing a circuit that may illuminate a green LED to indicate that the filter is sufficiently clean. As the flap is opened by air flow, the flap terminal breaks the "clean" circuit and contacts warning terminals arranged along the path of the flap terminal, closing circuits that may illuminate warning LEDs indicating levels of blockage in the filter.

DETAILED DESCRIPTION

Figure 1:
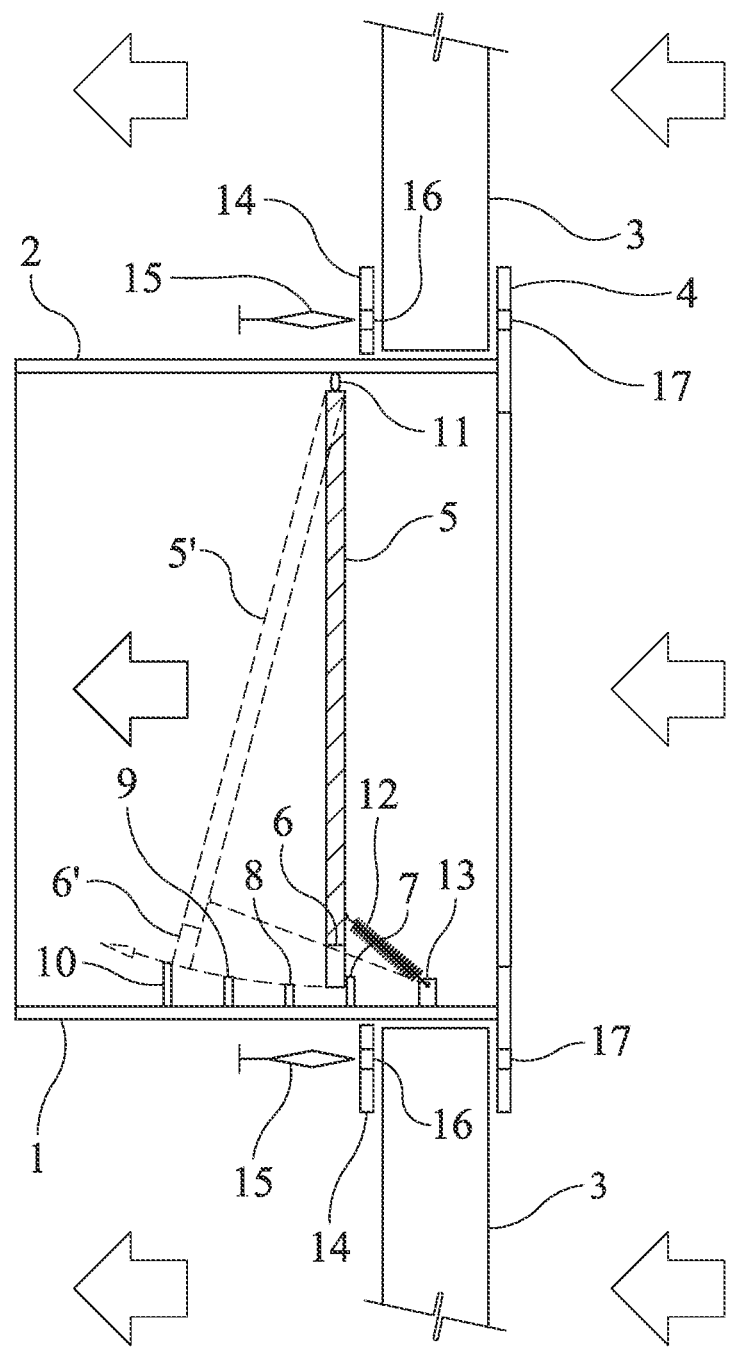
FIG. 1 shows an embodiment of the sensor with its primary component parts.

FIG. 1 shows an embodiment of the sensor of the current invention. Sensor 1 comprises a cylindrical tubular housing 2 secured to a HVAC return filter 3 by a circumferential flange 4 and a separate inner securing ring 14. Connectors 15 pass through a plurality of holes 16, 17 in ring 14 and flange 4, respectively. Movable flap 5 loosely fills the tubular opening and is pivotably connected at the top of housing 2 by a pin 11. The pivot connection allows flap 5 to rotate in the direction of the air flow entering sensor 1 and filter 3. Flap 5 is made of stiff, lightweight material such as plastic or clear vinyl.

Figure 3A:
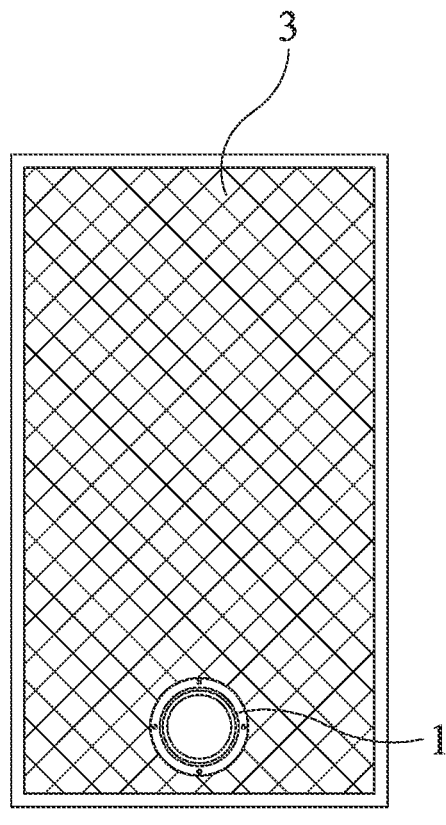
FIG. 3A shows a plan view of an embodiment of the sensor as mounted in a HVAC filter.
Figure 3B:
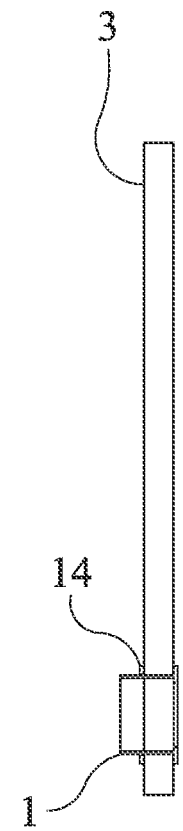
FIG. 3B shows a side view of the embodiment of FIG. 3A.
Figure 3C:
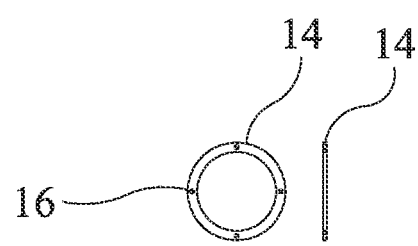
FIG. 3C shows a plan view and side view of a retaining ring for securing the sensor to a filter.

In a preferred embodiment, the tubular housing 2 is about 3 inches in diameter and 2 inches long. It may be made of plastic, PVC or other suitable material FIGS. 3A-C show an embodiment of a sensor unit in a typical filter. Although the illustrated embodiments show a circular tube, other tube cross sections, such as square or triangular may be used.

Flap 5 has the same shape as the cross section of the tubular housing 2, and in the closed position substantially blocks air flow through the sensor. Flap 5 is held in the closed position by tension spring 12, connected to flap 5 and spring anchor 13. When air is drawn through the sensor 1 with sufficient pressure, flap 5 swings in the direction of air flow to a second position 5'. When the HVAC system's exhaust fan turns off, the air flow stops and flap 5 returns to the closed position.

Flap terminal 6 is an electrical contact attached to the bottom of flap 5 and is wired to a power source. A plurality of measurement terminal electrical contact points, 7, 8, 9, 10 are arranged below the flap, placed along the path traced by the flap 5 as it swings open and are wired to create a completed circuit when the flap terminal 6 comes in contact with a measurement terminal.

Figure 2:
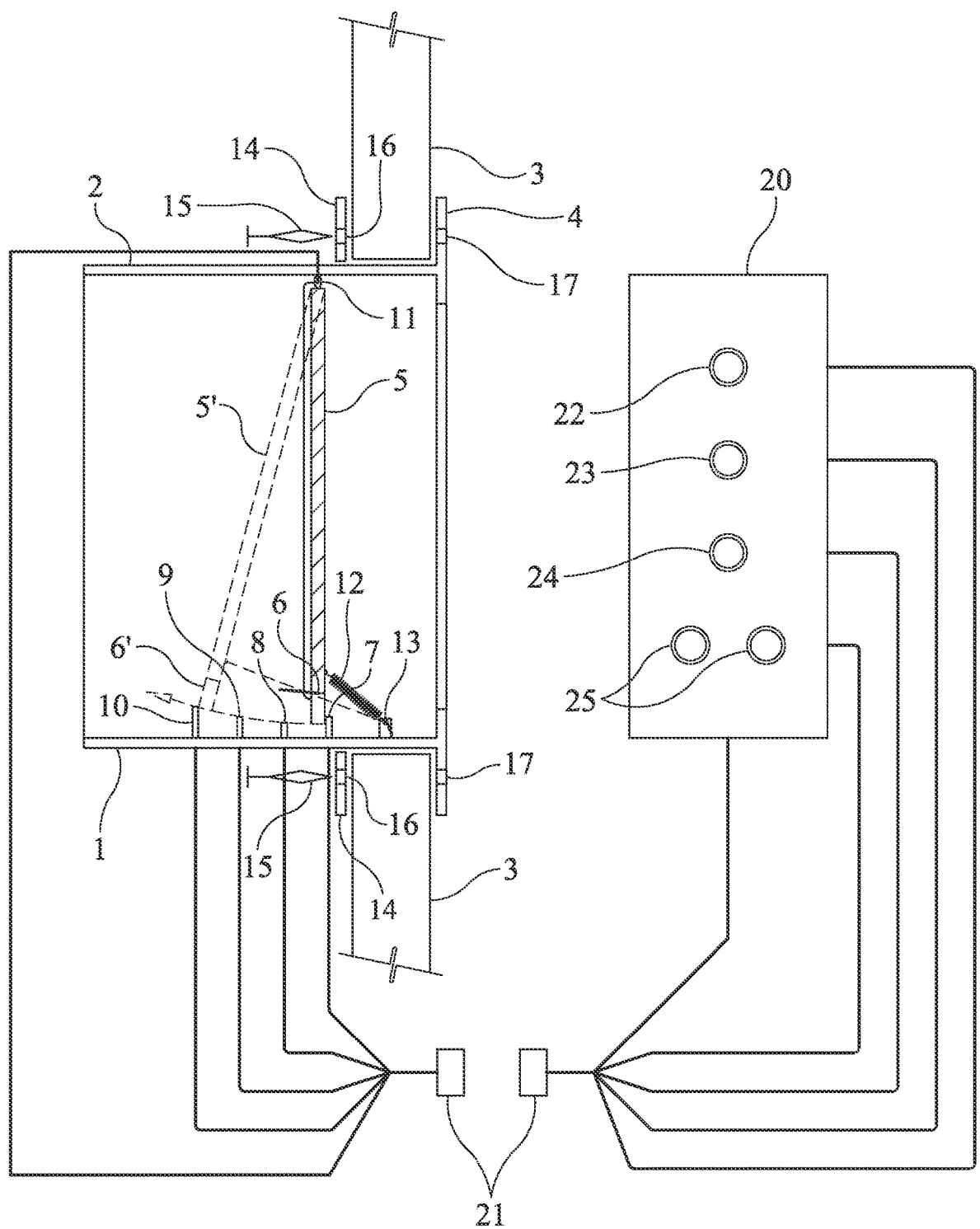
FIG. 2 shows the sensor of FIG. 1 with a wire harness connection to a set of indicator lights.

In an embodiment, the circuits in the sensor are connected by a wiring harness 21 to a display unit 20 comprising several signal lights, as illustrated in FIG. 2. A power source, such as a 9 volt battery, may be located at the sensor housing or at the display unit. Alternatively, power may be drawn by a connection to the HVAC unit or other building power source. The display unit may be mounted in an appropriate location for ready visibility. The first measurement terminal 7, which is contacted when the flap is in a closed position, is connected to a circuit that illuminates a green LED 22 on the display device, indicating that the filter is good. If the filter is partly clogged so the flap opens a predetermined amount, the flap terminal 6 comes in contact with measurement terminal 8, which is wired to illuminate a yellow LED 23 on the display unit 20, indicating that the filter will need to be replaced soon. Similarly, further clogging of the filter will result in greater opening of the flap 5, bringing the flap terminal 6 in contact with measurement terminal 9 (electrically connected to a red LED 24 on the display device, indicating a need for a filter change) and later to measurement terminal 10 (electrically connected to a pair of red LEDs 25 on the display device, indicating imminent damage). If this embodiment is hard-wired to the HVAC system, terminal 10 may also connect to a breaker that shuts the system down.

Figure 4:
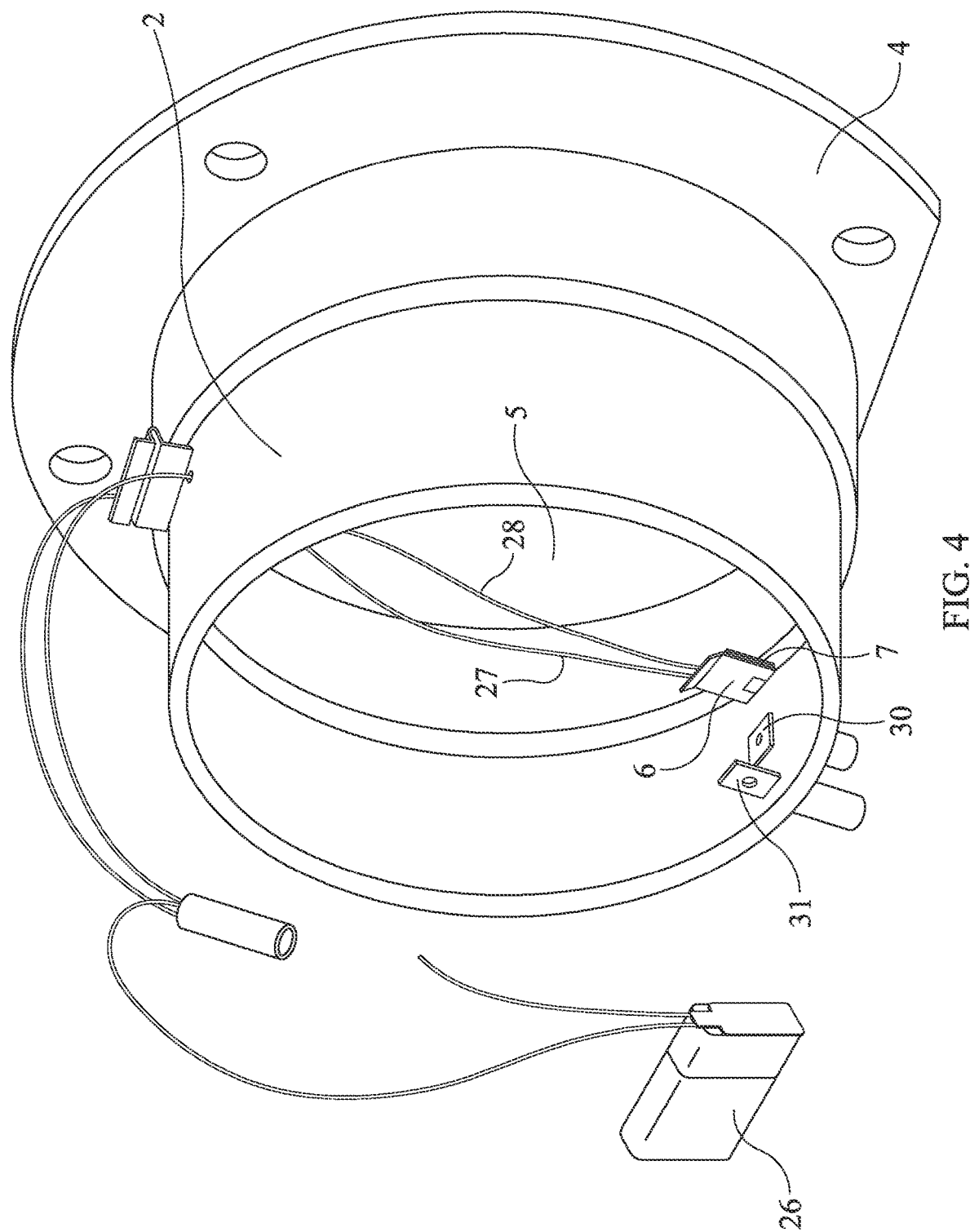
FIG. 4 shows a different embodiment of a sensor.

A simpler embodiment of a sensor is shown in FIG. 4. This embodiment also has a tubular housing 2 with a circumferential flange 4. Flap 5 is clear vinyl and movably fits inside the housing 2. Flap terminal 6 is on both the front and back of flap 5 and is connected to a battery 26 by wires 27, 28 on the front and back of flap 5, respectively. Measurement terminal 7 protrudes vertically from the tubular housing 2, so that when flap 5 hangs vertically terminal 6 touches terminal 7, closing a circuit that signals that the filter is clean. As the surrounding filter becomes clogged, forcing more air pressure to be applied at the flap 5, the flap opens from the bottom, breaking the circuit. The flap 5 returns to a vertical position, closing the "clean filter" circuit when the exhaust fan turns off. When air pressure causes the flap 5 to move far enough, terminal 6 touches terminal 30, closing a circuit that signals a partially impaired filter; again, the flap returns to a vertical position when the exhaust fan stops. Eventually, air pressure may open the flap so that it reaches terminal 31, whereupon a circuit signals that the filter should be replaced. Note that although the wiring from power source to terminal 6 is shown, the wiring connecting terminals 7, 30 and 31 to a signal device and back to the power source is not shown.

In an even simpler embodiment, particularly adaptable to residential applications, there may be only two measurement terminals, one at the closed or "clean filter" position and another at a "time to replace" position. The former may or may not connect to a green LED display or other signal indicating there is no problem, while the latter can connect to a warning LED display or some warning sound.

The sensor may be calibrated by adjusting the spring rate of tension spring 12, which regulates how much air pressure is required to move the flap 5. In a typical residential application, the design HVAC air velocity at the return grille (called face velocity) is 300 to 500 fps, in part to minimize noise. Other applications may have substantially higher flow. Ordinarily, the effect on flow of a new or clean filter at the opening is negligible. For a given flow rate, testing of specific filter designs will reveal the level of flow interference as the filter becomes dirty, as well as how far a sensor flap should open when the clogging reaches a problem level.

Most filters in common use have the same negligible flow resistance when new, although some filters, known as high-MERV filters, block smaller particles and exhibit greater initial resistance. Thus, for common residential applications implementing the standard face velocity, the sensor may be sold with a pair of tension springs of different spring rates, with the appropriate spring to be inserted based on the filter specifications. Alternatively, sensors may be configured and calibrated for specific combinations of filter design and system air flow. The disclosed sensor may be built into a filter with self-contained power and display components, or may be configured to be retrofit into an existing filter.

The disclosed sensor may be configured in a more sophisticated way in industrial or commercial applications. For example, a sensor could be hardwired to draw power from the HVAC unit itself, and may be configured to shut down the system if filter clogging reaches a predefined critical level. The sensor may also be connected to a remote display in the building or to a communication unit that generates either a signal, a text message or an email when a predetermined condition is detected. The communication device may be a remote transmitter to send such information over the internet or some dedicated frequency to a central monitoring station.

The foregoing description has been presented and is intended for the purposes of illustration and description. It is not intended to be exhaustive nor limit the invention to the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

I claim:

1. An air filter flow sensor for determining the effectiveness of an operating air filter, comprising
   a tubular housing inserted through a portion of the air filter;
   a pivotably mounted flap blocking air flow through the tubular housing, which opens in the direction of air flow as pressure builds behind the flap;
   a flap terminal at the base of the flap, wired to a power source; and
   a plurality of measurement terminals located on an inside surface of the tubular housing and positioned so the flap terminal will contact them as the flap opens and closes, wherein each measurement terminal is connected to a circuit that produces a signal when contacted by the flap terminal and the measurement terminals are spaced such that contact therewith indicates a predetermined condition of airflow through the filter.

2. The sensor of claim 1, further including a tension spring attached to the flap for regulating the movement of the flap in response to the air flow so that the flap terminal contacts the measurement terminals at predetermined air flow levels, and for returning the flap to a position in contact with a measurement terminal indicating no air flow.

3. The sensor of claim 1 further including an air filter surrounding the sensor.

4. The sensor of claim 1 wherein the measurement terminal circuits are connected via a wire harness to a power source and to an external display unit.

5. The sensor of claim 1 wherein the measurement terminal circuits are connected to a power source and to a communication unit that transmits circuit closure information to a remote location by wired or wireless connections.

6. The sensor of claim 1 wherein the tubular housing has a circular cross section.

7. The sensor of claim 6 wherein the tubular housing is about 3 inches in diameter and 2 inches long.

8. The sensor of claim 1 wherein a first measurement terminal is positioned to contact the flap terminal when the flap is not moved by incoming airflow and a second measurement terminal is positioned to contact the flap terminal when the extent of movement of the flap corresponds to a predetermined airflow level at which the filter should be replaced.

9. The sensor of claim 8, further including a tension spring attached to the flap for regulating the movement of the flap in response to the air flow so that the flap terminal contacts the measurement terminals at predetermined air flow levels, and for returning the flap to a position in contact with the first measurement terminal.

10. The sensor of claim 8, further including a measurement terminal located between the first and second measurement terminals and positioned to contact the flap terminal when the extent of movement of the flap corresponds to a predetermined air flow level indicating a predetermined condition of the filter not yet requiring replacement.

11. The sensor of claim 10, further including a tension spring attached to the flap for regulating the movement of the flap in response to the air flow so that the flap terminal contacts the measurement terminals at predetermined air flow levels, and for returning the flap to a position in contact with the first measurement terminal.

12. The sensor of claim 8, further including a plurality of measurement terminals located between the first and second measurement terminals, each positioned to contact the flap terminal when the extent of movement of the flap corresponds to a predetermined air flow level indicating a predetermined condition of the filter not yet requiring replacement.

13. The sensor of claim 12, further including a tension spring attached to the flap for regulating the movement of the flap in response to the air flow so that the flap terminal contacts the measurement terminals at predetermined air flow levels, and for returning the flap to a position in contact with the first measurement terminal.

14. An air flow sensor for installing on an aperture in an existing air filter, comprising
a tubular housing; a pivotably mounted flap blocking air flow through the tubular housing, which opens in the direction of air flow as pressure builds behind the flap; a flap terminal at the base of the flap, wired to a power source; and
a plurality of measurement terminals located on an inside surface of the tubular housing and positioned so the flap terminal will contact them as the flap opens and closes, wherein each measurement terminal is connected to a circuit that produces a signal when contacted by the flap terminal and the measurement terminals are spaced such that contact therewith indicates a predetermined condition of airflow through the filter.

15. The sensor of claim 14 wherein a first measurement terminal is positioned to contact the flap terminal when the flap is not moved by incoming airflow and a second measurement terminal is positioned to contact the flap terminal when the extent of movement of the flap corresponds to a predetermined airflow level at which the filter should be replaced.

16. The sensor of claim 15 further including a tension spring attached to the flap for regulating the movement of the flap in response to the air flow so that the flap terminal contacts the second measurement terminal at predetermined air flow levels, and for returning the flap to a position in contact with the first measurement terminal.

17. The sensor of claim 16 further including a circumferential flange on the tubular housing and a separate securing ring for securing the sensor to the filter; a power supply; and a display unit that indicates the closing of one of the circuits between the flap terminal and a measurement terminal.

18. The sensor of claim 17, wherein the power source is a 9 volt battery and the display unit comprises a LED that is activated by contact of the flap terminal with the second measurement terminal.

* * * * *